United States Patent
Prakash et al.

(10) Patent No.: US 11,315,280 B1
(45) Date of Patent: Apr. 26, 2022

(54) POSE ESTIMATION WITH LIMITED CORRESPONDENCES

(71) Applicant: Apple Inc., Cupertino, CA (US)

(72) Inventors: Jai Prakash, Cupertino, CA (US); Lina Maria Paz-Perez, Santa Clara, CA (US); Oliver Thomas Ruepp, Baierbrunn (DE)

(73) Assignee: APPLE INC., Cupertino, CA (US)

( * ) Notice: Subject to any disclaimer, the term of this patent is extended or adjusted under 35 U.S.C. 154(b) by 147 days.

(21) Appl. No.: 16/935,645

(22) Filed: Jul. 22, 2020

Related U.S. Application Data (60) Provisional application No. 62/906,458, filed on Sep. 26, 2019.

(51) Int. Cl.
    *G06T 7/73*     (2017.01)
    *G01V 7/00*     (2006.01)

(52) U.S. Cl.
    CPC . *G06T 7/73* (2017.01); *G01V 7/00* (2013.01)

(58) Field of Classification Search
    CPC .... G06T 7/70; G06T 7/73; G06T 7/74; G06T 7/80; G06T 2207/30244; G06V 10/10; G06V 10/20; G06V 10/768; G06V 30/262; G06K 9/00; G01V 7/00
    See application file for complete search history.

(56) References Cited

U.S. PATENT DOCUMENTS

| | | | |
|---|---|---|---|
| 2009/0202174 A1* | 8/2009 | Shiba | G06V 10/40 382/282 |
| 2013/0335575 A1* | 12/2013 | Tsin et al. | G06T 7/75 348/169 |
| 2015/0178903 A1* | 6/2015 | Maeno | G06T 5/006 382/275 |
| 2018/0089853 A1* | 3/2018 | Sawada | G01B 11/002 |
| 2020/0302643 A1* | 9/2020 | Sen et al. | G06T 7/74 |

* cited by examiner

*Primary Examiner* — Andrew W Johns
(74) *Attorney, Agent, or Firm* — Fernando & Partners, LLP (57) ABSTRACT

Various implementations disclosed herein include devices, systems, and methods for pose estimation using one point correspondence, one line correspondence, and a directional measurement. In various implementations, a device includes a non-transitory memory and one or more processors coupled with the non-transitory memory. In some implementations, a method includes obtaining an image corresponding to a physical environment. A first correspondence between a first set of pixels in the image and a spatial point in the physical environment is determined. A second correspondence between a second set of pixels in the image and a spatial line in the physical environment is determined. Pose information is generated as a function of the first correspondence, the second correspondence, and a directional measurement.

20 Claims, 8 Drawing Sheets

POSE ESTIMATION WITH LIMITED CORRESPONDENCES

CROSS REFERENCE TO RELATED APPLICATIONS

This application claims priority to U.S. patent application No. 62/906,458, filed on Sep. 26, 2019, which is hereby incorporated by reference in its entirety.

TECHNICAL FIELD

The present disclosure generally relates to pose estimation.

BACKGROUND

Pose estimation continues to be of interest in machine vision. Some machine vision systems use a point cloud for pose estimation. However, estimating the pose of a camera using a point cloud can be computationally expensive. For example, a large number of points may be used to solve for all of the degrees of freedom involved in pose estimation. Some pose estimation techniques are sensitive to rotational noise and/or translational noise that are common in sensor outputs.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for pose estimation using one point correspondence, one line correspondence, and a directional measurement. In various implementations, a device includes a non-transitory memory and one or more processors coupled with the non-transitory memory. In some implementations, a method includes obtaining an image corresponding to a physical environment. A first correspondence between a first set of pixels in the image and a spatial point in the physical environment is determined. A second correspondence between a second set of pixels in the image and a spatial line in the physical environment is determined. Pose information is generated as a function of the first correspondence, the second correspondence, and a directional measurement.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Some machine vision systems perform pose estimation to determine the orientation of a camera with respect to a coordinate system. To this end, some machine vision systems use a point cloud for pose estimation. However, estimating the pose of a camera using a point cloud can be computationally expensive. For example, a large number of points may be used to solve for all of the degrees of freedom involved in pose estimation.

Some machine vision systems perform pose estimation using three line correspondences. For example, some machine vision systems determine correspondences between three sets of pixels in an image and three corresponding spatial lines in a physical environment. This approach represents an over-constrained solution, however. While pose estimation using this approach may be tolerant of translational and rotational errors in a sensor output, this solution is not a minimal solver (e.g., because this solution requires determining more than a threshold number of correspondences). Accordingly, estimating the pose of a camera using three line correspondences may be computationally expensive. For example, a large amount of data may be involved.

Some machine vision systems perform pose estimation using two line correspondences and one point correspondence. For example, some machine vision systems determine correspondences between two sets of pixels in an image and two corresponding spatial lines in a physical environment. Such systems also determine an additional correspondence between a set of pixels in the image and a corresponding spatial point in the physical environment. Similar to using three line correspondences, however, pose estimation using two line correspondences and one point correspondence is not a minimal solver and may be computationally expensive.

Some machine vision systems perform pose estimation using two point correspondences. For example, some machine vision systems determine correspondences between two sets of pixels in an image and two corresponding spatial points in a physical environment. Pose estimation using two point correspondences is a minimal solver (e.g., because this approach requires determining less than a threshold number of correspondences) and may be less computationally expensive than other approaches. In addition, pose estimation using this approach may be tolerant of translational errors in a sensor output. However, this approach may be prone to rotational error.

The present disclosure provides methods, systems, and/or devices for estimating the pose of a camera using one line correspondence, one point correspondence, and a known directional measurement. In various implementations, a device includes a non-transitory memory and one or more processors coupled with the non-transitory memory. In some implementations, a method includes obtaining an image corresponding to a physical environment. A first correspondence is determined between a first set of pixels in the image and a spatial point in the physical environment. A second correspondence is determined between a second set of pixels in the image and a spatial line in the physical environment. In some implementations, pose information is generated as a function of the first correspondence, the second correspondence, and a directional measurement.

In some implementations, determining the first correspondence between the first set of pixels in the image and the spatial point in the physical environment produces an acceptable number of translational errors, e.g., fewer translational errors than some implementations. In some implementations, determining the second correspondence between the second set of pixels in the image and the spatial line in the physical environment produces an acceptable number of rotational errors, e.g., fewer rotational errors than some implementations. Accordingly, using the first and second correspondences and a known directional measurement, e.g., a known gravity vector, to determine the pose of a camera may result in an implementation that is more resilient with respect to both rotational noise and translational noise. In addition, some implementations represent minimal solvers and use fewer data points for pose estimation.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

Figure 1:
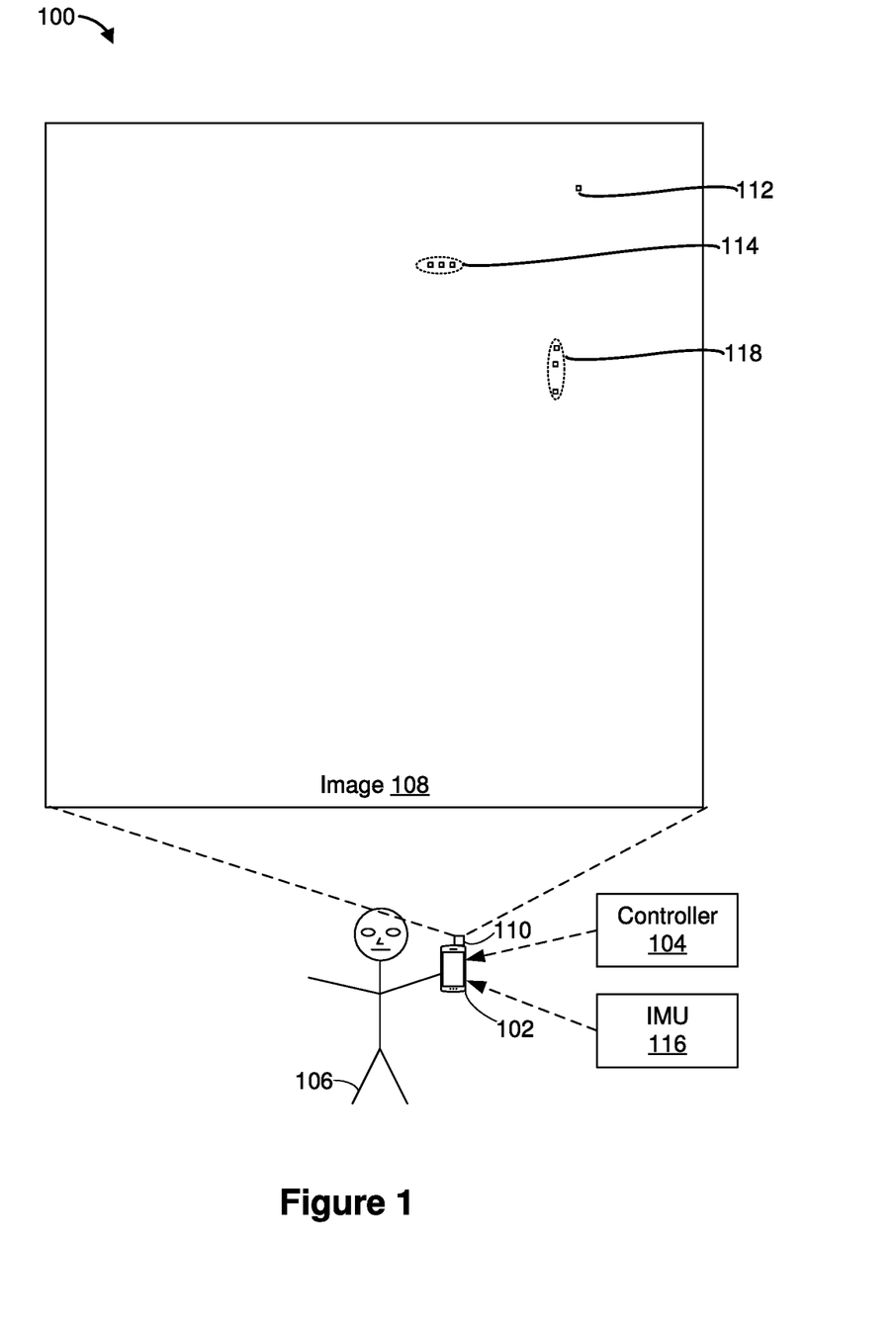
FIG. 1 illustrates an exemplary operating environment in accordance with some implementations.

FIG. 1 illustrates an exemplary operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes an electronic device 102 and a controller 104. In some implementations, the electronic device 102 is or includes a smartphone, a tablet, a laptop computer, a desktop computer, or a wearable computing device such as an electronic watch or a head-mountable device (HMD). The electronic device 102 may be worn by or carried by a user 106.

As illustrated in FIG. 1, in some implementations, the electronic device 102 obtains an image 108 that corresponds to a physical environment. In some implementations, the image 108 is captured by an image sensor, such as a camera 110 associated with the electronic device 102 and/or the controller 104. In some implementations, the image 108 is obtained from another device that is in communication with the electronic device 102 and/or the controller 104.

In some implementations, the image 108 is a still image. In some implementations, the image 108 is an image frame forming part of a video feed. The image 108 includes a plurality of pixels. Pixels in the image 108 may correspond to features in a physical environment. For example, a set of pixels, e.g., a pixel, in the image 108 may correspond to a spatial point in the physical environment. As another example, another set of pixels in the image 108 may correspond to a spatial line in the physical environment.

In some implementations, the electronic device 102 and/or the controller 104 determines a first correspondence. The first correspondence may be a point correspondence. In some implementations, the first correspondence is between a first set of pixels 112 in the image 108, e.g., a single pixel in the image 108, and a spatial point in the physical environment.

In some implementations, the electronic device 102 and/or the controller 104 determines a second correspondence. The second correspondence may be a line correspondence. In some implementations, the second correspondence is between a second set of pixels 114 in the image 108 and a spatial line in the physical environment.

In some implementations, the electronic device 102 and/or the controller 104 determines a directional measurement. The directional measurement may be a gravity measurement that relates to a direction of gravity, such as a gravity vector. For example, in some implementations, the electronic device 102 includes an inertial measurement unit (IMU) 116. In some implementations, the gravity measurement is derived from the IMU 116. The gravity vector may be synthesized based on the gravity measurement.

In some implementations, the gravity measurement is derived from the image 108. For example, the image 108 may include a set of pixels 118, e.g., a line, that may correspond to a vertical line in the physical environment, such as a portion of a window or a door. In some implementations, the direction of gravity is inferred from the orientation of the set of pixels 118. As another example, a gravity vector may be determined based on an orientation of a physical article, e.g., a window or a door, that is represented by the set of pixels 118.

In some implementations, the electronic device 102 and/or the controller 104 generate pose information, e.g., estimate, as a function of the first correspondence, the second correspondence, and a directional measurement. The directional measurement may be the gravity measurement.

In some implementations, a head-mountable device (HMD), being worn by the user 106, obtains the image 108 according to various implementations. In some implementations, the HMD includes an integrated display (e.g., a built-in display) that displays a computer-generated reality (CGR) environment. In some implementations, the HMD includes a head-mountable enclosure. In various implementations, the head-mountable enclosure includes an attachment region to which another device with a display can be attached. For example, in some implementations, the electronic device 102 of FIG. 1 can be attached to the head-mountable enclosure. In various implementations, the head-mountable enclosure is shaped to form a receptacle for receiving another device that includes a display (e.g., the electronic device 102). For example, in some implementations, the electronic device 102 slides or snaps into or otherwise attaches to the head-mountable enclosure. In some implementations, the display of the device attached to the head-mountable enclosure presents (e.g., displays) the CGR environment. In various implementations, examples of the electronic device 102 include smartphones, tablets, media players, laptops, electronic watches, etc.

Figure 2:
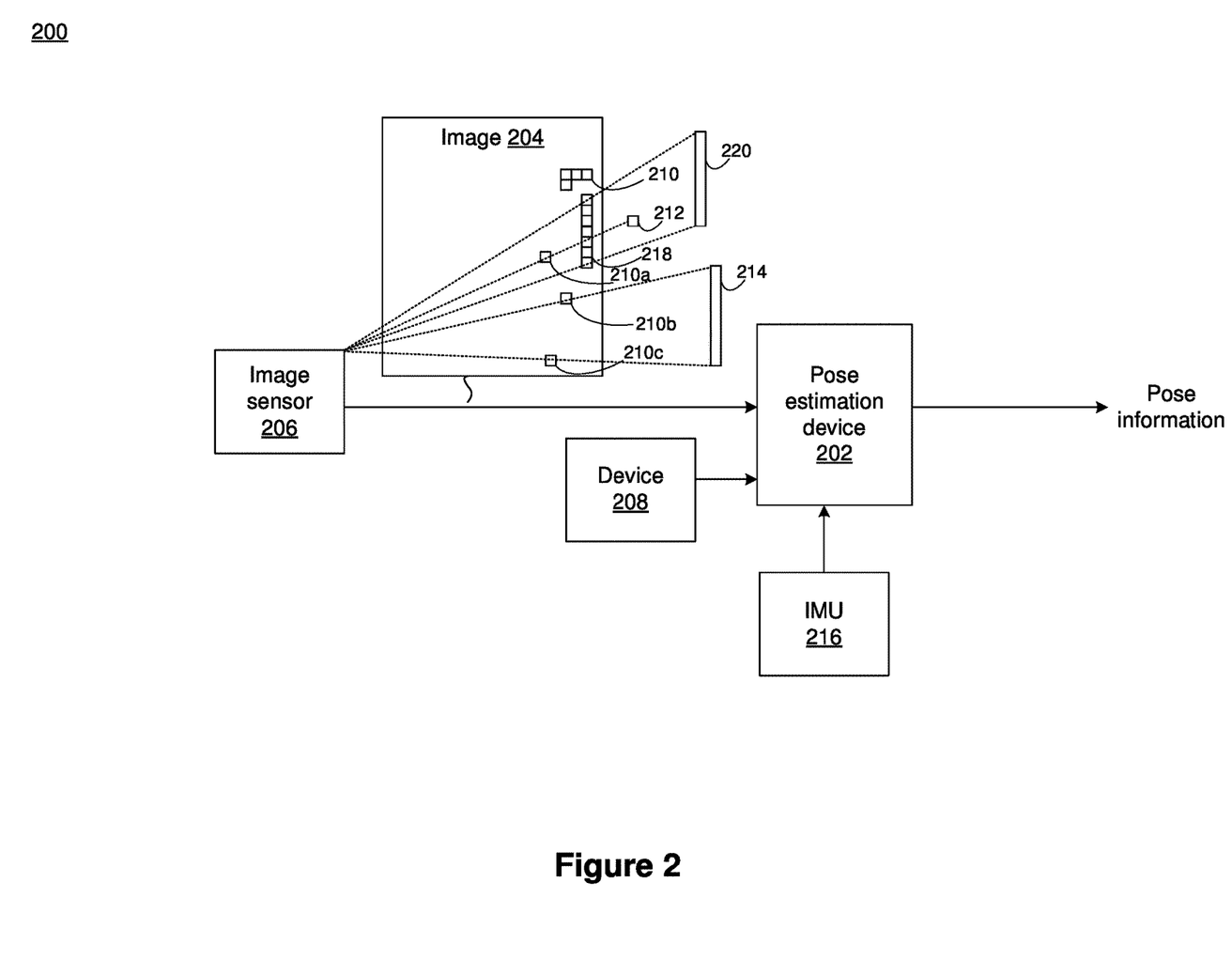
FIG. 2 illustrates an example system that performs camera pose estimation according to various implementations.

FIG. 2 illustrates an example system 200 that performs camera pose estimation according to various implementations. In some implementations, a pose estimation device 202 obtains an image 204. The pose estimation device 202 may obtain the image 204 from an image sensor 206 or another component of a device in which the pose estimation device 202 is integrated, such as, for example, the electronic device 102 of FIG. 1 or an HMD. In some implementations, the pose estimation device 202 obtains the image 204 from a device 208 that is external to a device in which the pose estimation device 202 is integrated. For example, if the pose estimation device 202 is integrated in the electronic device 102 of FIG. 1, the pose estimation device 202 may obtain the image 204 from another electronic device with which the electronic device 102 is in communication.

The image 204 comprises a plurality of pixels 210. The pixels 210 may correspond to features in a physical environment. For example, a set of pixels, e.g., a pixel, in the image 204 may correspond to a spatial point in the physical environment (e.g., a corner of a table). As another example, another set of pixels in the image 204 may correspond to a spatial line in the physical environment (e.g., an edge of a table). In some implementations, the spatial point and/or the spatial line in the physical environment may be represented by a model (e.g., a global model) of feature points and/or feature lines in a database. In some implementations, a set of pixels, e.g., a pixel, in the image 204 is compared against the model to determine one or more correspondences.

In some implementations, the pose estimation device 202 may determine a first correspondence. The first correspondence may be a point correspondence. In some implementations, the pose estimation device 202 determines a point correspondence between a first set of pixels, e.g., a pixel 210a, in the image 204, and a spatial point 212 in the physical environment. In some implementations, determining the point correspondence includes mapping the first set of pixels, e.g., the pixel 210a, in the image 204, to the spatial point 212 in the physical environment.

In some implementations, the pose estimation device 202 may determine a second correspondence. The second correspondence may be a line correspondence. In some implementations, the pose estimation device 202 determines a line correspondence between a second set of pixels, e.g., a set of pixels including pixels 210b and 210c, and a spatial line 214 in the physical environment. In some implementations, determining the line correspondence includes mapping the second set of pixels, e.g., the set of pixels including pixels 210b and 210c, to the spatial line 214 in the physical environment.

In some implementations, the pose estimation device 202 may determine a directional measurement. The directional measurement may be a gravity measurement that relates to a direction of gravity, such as a gravity vector. For example, in some implementations, the system 200 includes an inertial measurement unit (IMU) 216. In some implementations, the gravity measurement is derived from the IMU 216. The pose estimation device 202 may synthesize the gravity vector based on the gravity measurement.

In some implementations, the pose estimation device 202 derives the gravity measurement from the image 204. For example, the image 204 may include a set of pixels 218, e.g., a line, that may correspond to a vertical line 220 in the physical environment. The vertical line 220 in the physical environment may be part of another physical feature, such as a portion of a window or a door. In some implementations, the pose estimation device 202 infers the direction of gravity from the orientation of the set of pixels 218. As another example, the pose estimation device 202 may determine a gravity vector based on an orientation of a physical article, e.g., a window or a door, that is represented by the set of pixels 218. For example, the pose estimation device 202 may determine that the gravity vector is aligned with a door (e.g., an edge of the door) represented by the set of pixels 218.

In some implementations, the pose estimation device 202 generates (e.g., estimates) pose information as a function of the first correspondence, the second correspondence, and a directional measurement. The directional measurement may be the gravity measurement.

In some implementations, the pose estimation device 202 determines a plurality of point correspondences between the first set of pixels in the image 204 and the spatial point 212 in the physical environment. Some of the point correspondences may be inliers that may be useful for determining pose information. Other point correspondences may be outliers that may not be useful for determining pose information. In some implementations, the pose estimation device 202 determines a set of inliers, e.g., by eliminating point correspondences that are outliers from consideration.

In some implementations, the pose estimation device 202 determines a plurality of line correspondences between second sets of pixels in the image 204 and spatial lines 214 in the physical environment. Some of the line correspondences may be inliers that may be useful for determining pose information. Other line correspondences may be outliers that may not be useful for determining pose information. In some implementations, the pose estimation device 202 determines a set of inliers, e.g., by eliminating line correspondences that are outliers from consideration.

In some implementations, the pose estimation device 202 generates (e.g., estimates) pose information as a function of a plurality of sets of first correspondences, second correspondences, and directional measurements. For example, the pose estimation device 202 may determine (e.g., by random or pseudorandom selection) a plurality of sets of point correspondences, line correspondences, and gravity vectors and may generate (e.g., estimate) pose information for each set of a point correspondence, a line correspondence, and a gravity vector. In some implementations, this process is iterated a plurality of times to generate a plurality of pose information candidates (e.g., candidate pose estimates). In some implementations, the pose estimation device 202 selects the pose information candidate that is supported by the greatest number of sets of point correspondences, line correspondences, and gravity vectors to output as the pose information, e.g., as an acceptable pose estimate.

Figure 3:
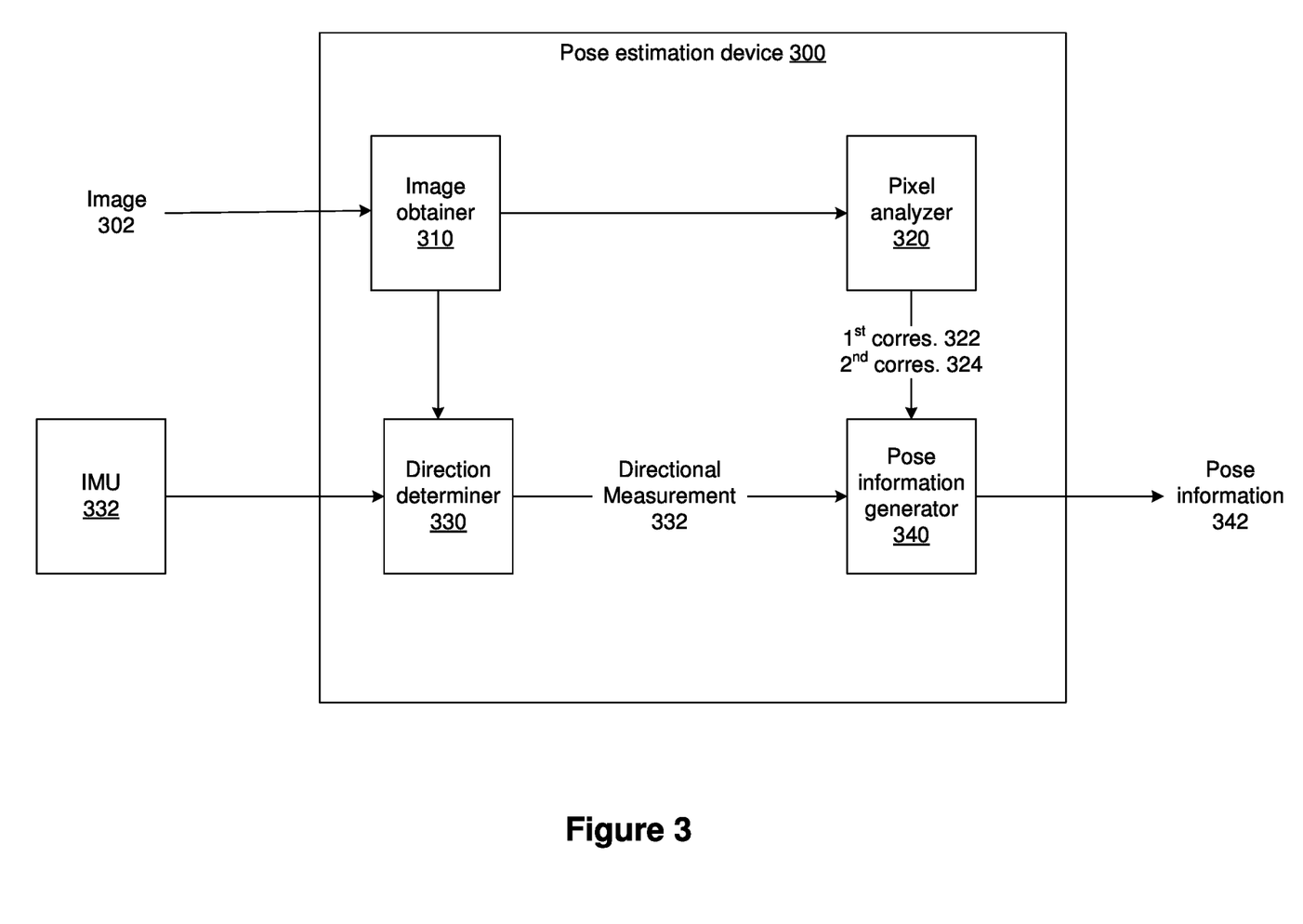
FIG. 3 is a block diagram of an example pose estimation device in accordance with some implementations.

FIG. 3 is a block diagram of an example pose estimation device 300 in accordance with some implementations. In some implementations, the pose estimation device 300 implements the pose estimation device 202 shown in FIG. 2. In some implementations, the pose estimation device 300 obtains an image 302.

In some implementations, an image obtainer 310 obtains the image 302. The image obtainer 310 may obtain the image 302 from a component of a device in which the pose estimation device 300 is integrated. For example, if the pose estimation device 300 is integrated in the electronic device 102 of FIG. 1, the electronic device 102 may have an image sensor, such as a camera, that may capture the image 302 and provide the image 302 to the image obtainer 310. In some implementations, the image obtainer 310 obtains the image 302 from another device. For example, if the pose estimation device 300 is integrated in the electronic device 102 of FIG. 1, the image obtainer 310 may obtain the image 302 from a device with which the electronic device 102 is in communication.

In some implementations, the image 302 comprises a plurality of pixels. The pixels may correspond to features in a physical environment. For example, a set of pixels, e.g., a pixel, in the image 302 may correspond to a spatial point in the physical environment. As another example, another set of pixels in the image 302 may correspond to a spatial line in the physical environment.

In some implementations, a pixel analyzer 320 may determine a first correspondence 322. The first correspondence 322 may be a point correspondence. In some implementations, the pixel analyzer 320 determines a point correspondence between a first set of pixels, e.g., a single pixel, in the image 302, and a spatial point in the physical environment. For example, the pixel analyzer 320 determines that the first set of pixels (e.g., the single pixel) in the image 302 represents the spatial point in the physical environment. In some implementations, the first correspondence 322 represents a mapping between the first set of pixels and the spatial point in the physical environment.

In some implementations, the pixel analyzer 320 may determine a second correspondence 324. The second correspondence 324 may be a line correspondence. In some implementations, the pixel analyzer 320 determines a line correspondence between a second set of pixels and a spatial line in the physical environment. For example, the pixel analyzer 320 determines that the second set of pixels (e.g., a set of pixels arranged in a line) represent the spatial line in the physical environment. In some implementations, the second correspondence 324 represents a mapping between the second set of pixels and the spatial line in the physical environment.

In some implementations, a direction determiner 330 may determine a directional measurement 332. The directional measurement 332 may be a gravity measurement that relates to a direction of gravity, such as a gravity vector. For example, in some implementations, the direction determiner 330 derives the directional measurement 332 from an inertial measurement unit (IMU) 332. The direction determiner 330 may synthesize the gravity vector based on the gravity measurement.

In some implementations, the direction determiner 330 derives the gravity measurement from the image 302. For example, the image 302 may include a set of pixels, e.g., a line, that may correspond to a vertical line in the physical environment. The vertical line in the physical environment may be part of another physical feature, such as a portion of a window or a door. In some implementations, the direction determiner 330 infers the direction of gravity from the orientation of the set of pixels that corresponds to the vertical line in the physical environment. As another example, the direction determiner 330 may determine a gravity vector based on an orientation of a physical article, e.g., a window or a door, that is represented by the set of pixels. For example, the direction determiner 330 may determine that the gravity vector is aligned with a door (e.g., an edge of the door) represented by the set of pixels.

In some implementations, a pose information generator 340 generates (e.g., estimates) pose information 342 as a function of the first correspondence, the second correspondence, and a directional measurement. The directional measurement may be the gravity measurement.

In some implementations, the pixel analyzer 320 determines a plurality of point correspondences between first sets of pixels in the image 302 and spatial points in the physical environment. Some of the point correspondences may be inliers that may be useful for determining pose information. Other point correspondences may be outliers that may not be useful for determining pose information. In some implementations, the pose information generator 340 determines a set of inliers, e.g., by eliminating point correspondences that are outliers from consideration.

In some implementations, the pixel analyzer 320 determines a plurality of line correspondences between second sets of pixels in the image 302 and spatial lines in the physical environment. Some of the line correspondences may be inliers that may be useful for determining pose information. Other line correspondences may be outliers that may not be useful for determining pose information. In some implementations, the pose information generator determines a set of inliers, e.g., by eliminating line correspondences that are outliers from consideration.

In some implementations, the pose information generator 340 generates (e.g., estimates) the pose information 342 as a function of a plurality of sets of first correspondences, second correspondences, and directional measurements. For example, the pose information generator 340 may determine (e.g., by random or pseudorandom selection) a plurality of sets of point correspondences, line correspondences, and gravity vectors and may generate (e.g., estimate) pose information for each set of a point correspondence, a line correspondence, and a gravity vector. In some implementations, this process is iterated a plurality of times to generate a plurality of pose information candidates (e.g., candidate pose estimates). In some implementations, the pose information generator 340 selects the pose information candidate that is supported by the greatest number of sets of point correspondences, line correspondences, and gravity vectors to output as the pose information 342, e.g., as an acceptable pose estimate.

Figure 4A:
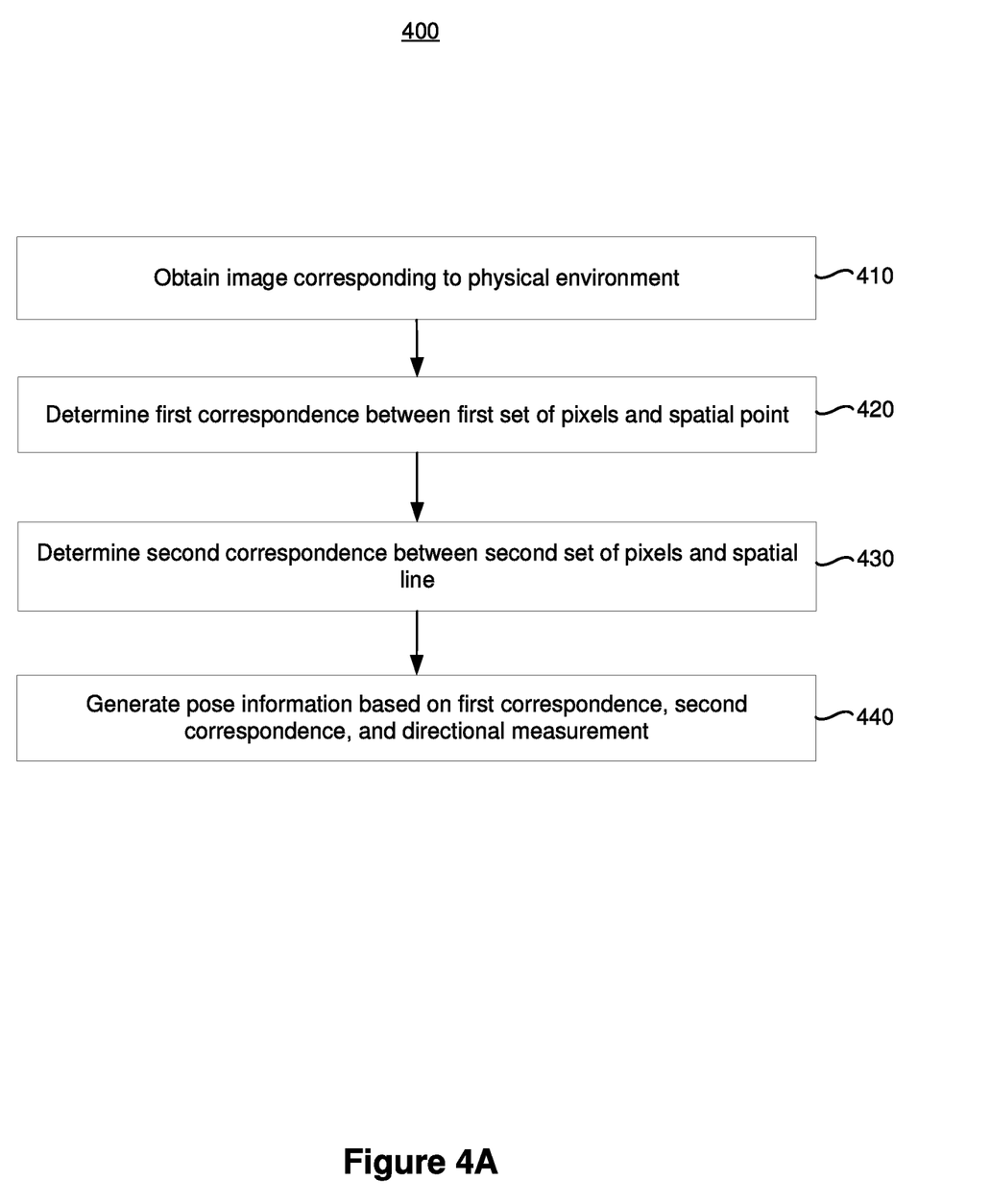
FIGS. 4A-4C are a flowchart representation of a method for performing camera pose estimation in accordance with some implementations.
Figure 4B:
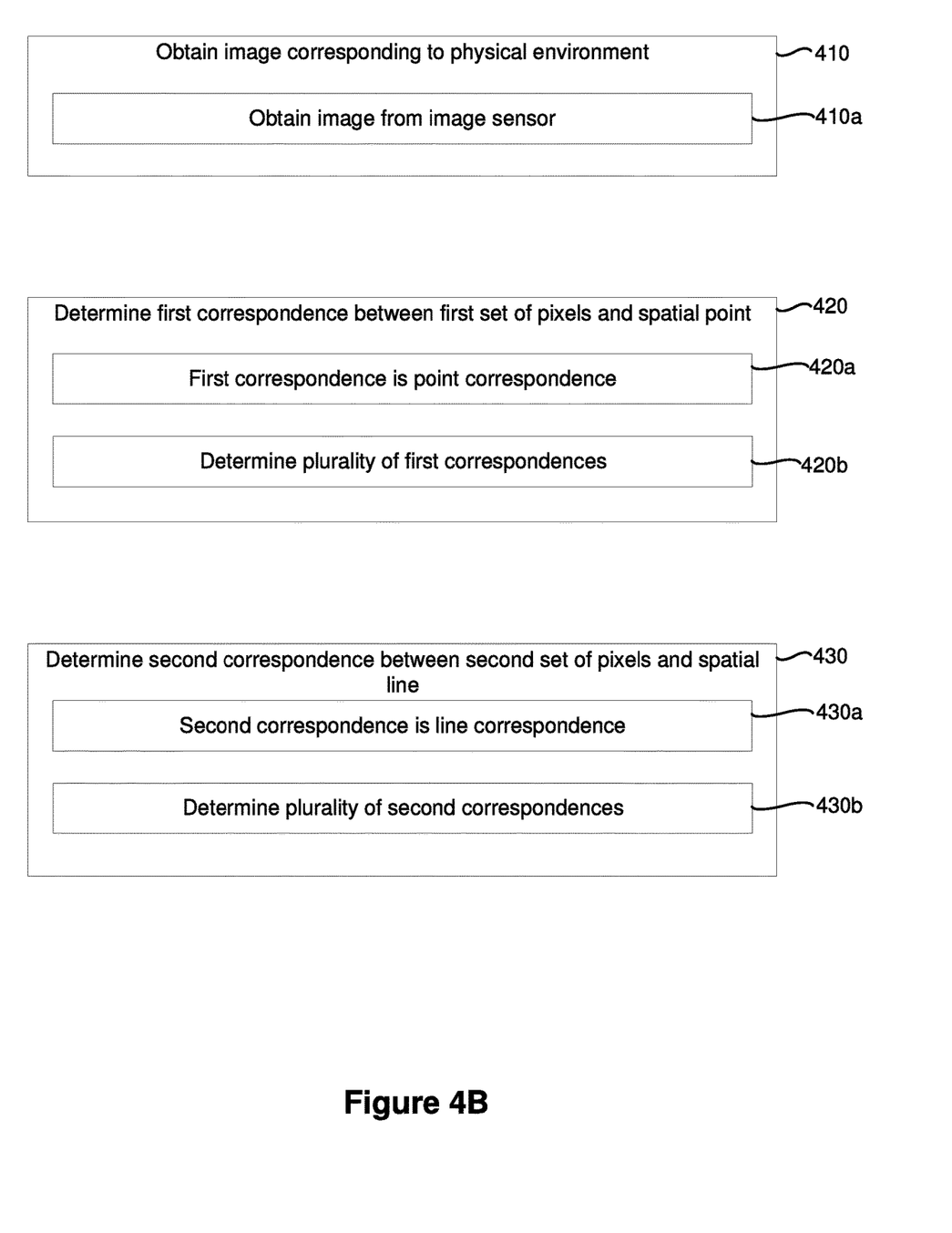
Figure 4C:
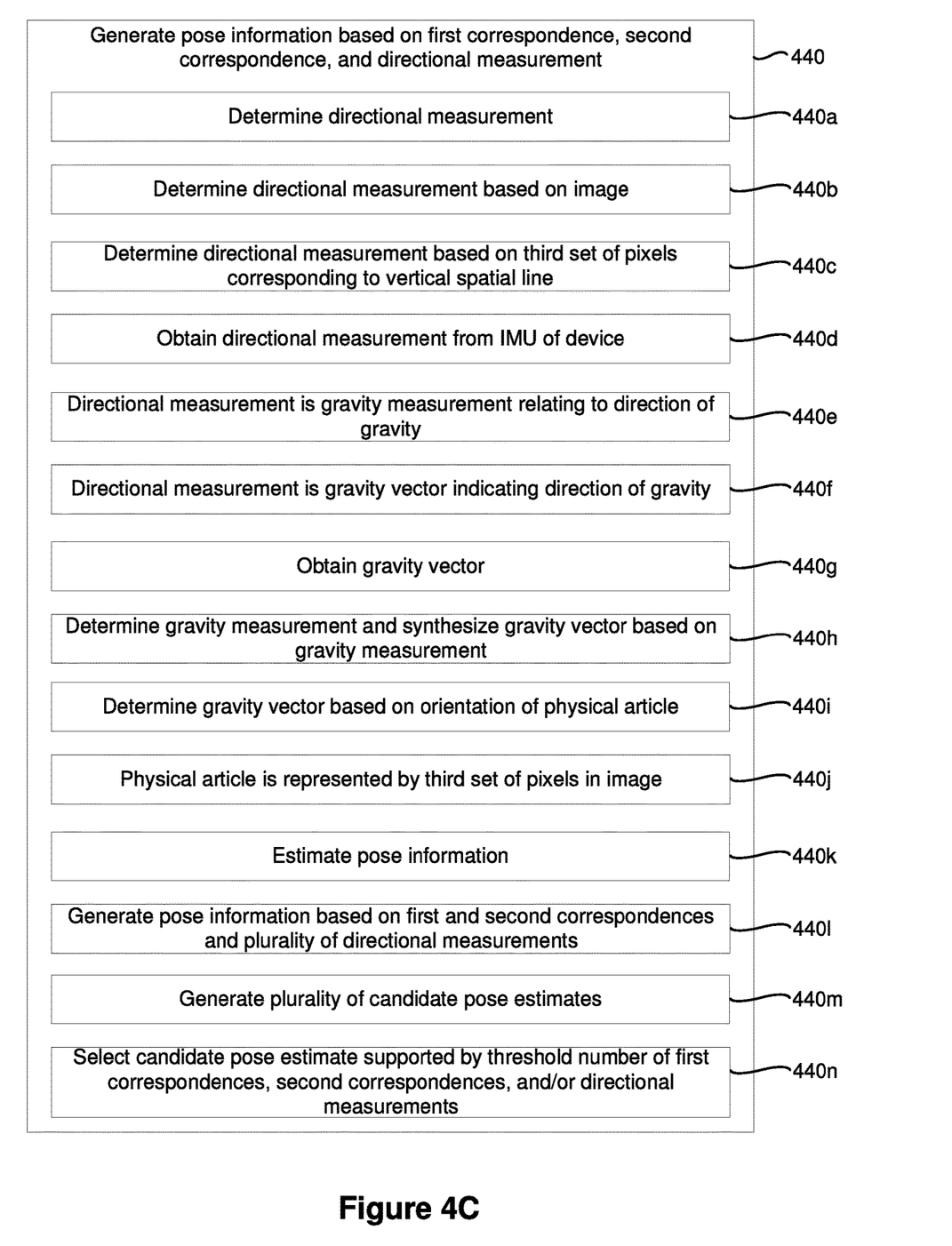

FIGS. 4A-4C are a flowchart representation of a method 400 for performing camera pose estimation in accordance with some implementations. In various implementations, the method 400 is performed by a device (e.g., the electronic device 102 shown in FIG. 1, the system 200 shown in FIG. 2, or the pose estimation device 300 shown in FIG. 3). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes obtaining an image corresponding to a physical environment, determining a first correspondence between a first set of pixels in the image and a spatial point in the physical environment, determining a second correspondence between a second set of pixels in the image and a spatial line in the physical environment, and generating pose information as a function of the first and second correspondences and a directional measurement.

As represented by block 410, in various implementations, the method 400 includes obtaining an image corresponding to a physical environment. Referring now to FIG. 4B, as represented by block 410a, in some implementations, the method 400 includes obtaining the image from an image sensor, such as a camera associated with the electronic device 102 of FIG. 1. The pixels may correspond to (e.g., represent) features in a physical environment. For example, a set of pixels, e.g., a pixel, in the image may correspond to a spatial point in the physical environment. As another example, another set of pixels in the image may correspond to a spatial line in the physical environment.

As represented by block 420, in some implementations, the method 400 includes determining a first correspondence between a first set of pixels in the image and a spatial point in the physical environment (e.g., the first correspondence 322 shown in FIG. 3). Referring again to FIG. 4B, as represented by block 420a, in some implementations, the first correspondence is a point correspondence. As represented by block 420b, in some implementations, the method 400 includes determining a plurality of first correspondences between a plurality of first sets of pixels in the image and respective spatial points in the physical environment. For example, multiple pixels in the image may be matched with spatial points.

As represented by block 430, in some implementations, the method 400 includes determining a second correspondence between a second set of pixels in the image and a spatial line in the physical environment (e.g., the second correspondence 324 shown in FIG. 3). As represented by block 430a, in some implementations, the second correspondence is a line correspondence. As represented by block 430b, in some implementations, the method 400 includes determining a plurality of second correspondences between a plurality of second sets of pixels in the image and respective spatial lines in the physical environment. For example, multiple sets of pixels in the image may be matched with spatial lines.

As represented by block 440, in some implementations, the method 400 includes generating pose information as a function of the first correspondence, the second correspondence, and a directional measurement (e.g., the pose information 342 shown in FIG. 3). Referring now to FIG. 4C, as represented by block 440a, in some implementations, the method 400 includes determining the directional measurement.

In some implementations, as represented by block 440b, the directional measurement (e.g., the directional measurement 332 shown in FIG. 3) may be determined based on the image. For example, the image may include a set of pixels, e.g., a line, that may correspond to a vertical line in the physical environment. The vertical line in the physical environment may be part of another physical feature, such as a portion of a window or a door. In some implementations, as represented by block 440c, the directional measurement is determined based on this set of pixels.

In some implementations, as represented by block 440d, the electronic device 102 includes an IMU, and the method 400 includes obtaining the directional measurement from the IMU. As represented by block 440e, in some implementations, the directional measurement may be a gravity measurement relating to a direction of gravity. As represented by block 440f, in some implementations, the directional measurement is a gravity vector indicating a direction of gravity. In some implementations, the method 400 includes obtaining the gravity vector, as represented by block 440g. Obtaining the gravity vector may include, in some implementations, determining a gravity measurement, e.g., from the IMU, and synthesizing the gravity vector based on the gravity measurement, as represented by block 440h.

In some implementations, the gravity vector is obtained by determining the gravity vector based on an orientation of a physical article, as represented by block 440i. For example, as represented by block 440j, in some implementations, a set of pixels represents the physical article, which may be, e.g., a window or a door. It may be determined that the gravity vector is aligned with the physical article. For example, if the physical article is a door, it may be determined that the gravity vector is aligned with an edge of the door. In some implementations, it may be determined that the gravity vector is perpendicular to the physical article, e.g., if the physical article is known to be horizontal. For example, if the physical article is a table, but only the tabletop (e.g., a horizontal edge) is visible in the image, it may be determined that the gravity vector is perpendicular to the tabletop.

In some implementations, as represented by block 440k, generating the pose information involves estimating the pose information. If, as represented by blocks 420b and 430b, multiple first correspondences and second correspondences are determined, the pose information may be generated as a function of the first correspondences, the second correspondences, and a plurality of directional measurements, as represented by block 440l. For example, as represented by block 440m, the method 400 may include generating a plurality of candidate pose estimates as a function of the first correspondences, the second correspondences, and the directional measurements. In some implementations, as represented by block 440n, the method 400 may include selecting, from among the plurality of candidate pose estimates, the candidate pose estimate that is supported by a threshold number of the first correspondences, the second correspondences, and/or the directional measurements. The selected candidate pose estimate may represent the most acceptable candidate pose estimate. For example, the method 400 may include selecting the candidate pose estimate that is supported by the greatest number of sets of first correspondences, second correspondences, and directional measurements.

Figure 5:
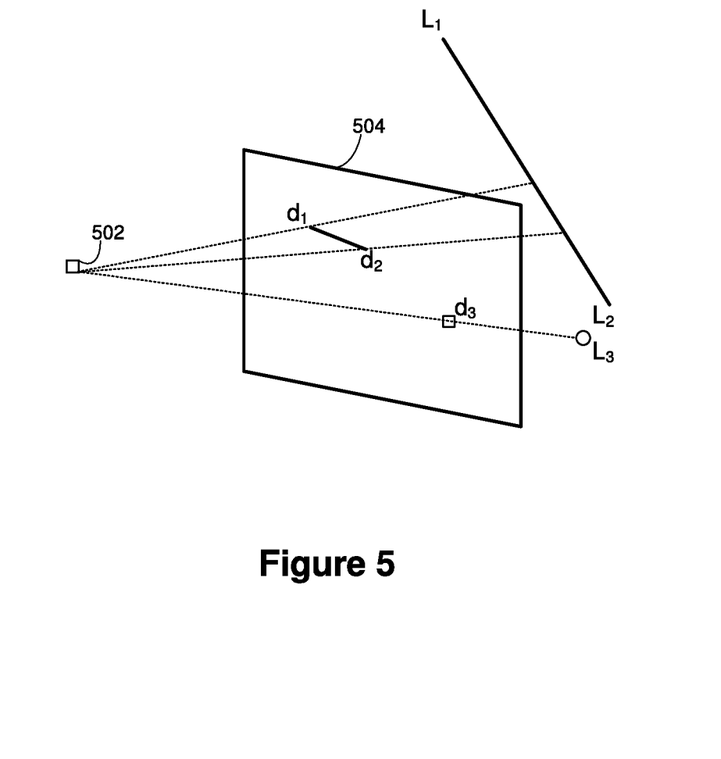
FIG. 5 is a schematic diagram illustrating reprojection of a point and a line in an image according to some implementations.

FIG. 5 is a schematic diagram illustrating reprojection of a point and a line in an image according to some implementations. As illustrated in FIG. 5, a camera 502 captures an image 504 that corresponds to a physical environment. In the image 504, a first correspondence may be determined between a pixel $d_3$ in the image and a spatial point $L_3$ in the physical environment. A second correspondence may be determined between a set of pixels, e.g., pixels $d_1$ and $d_2$ in the image and a spatial line $L_1L_2$ in the physical environment.

As illustrated in FIG. 5, the spatial line $L_1L_2$ forms a plane with the camera 502. This plane also passes through a line $d_1d_2$ in the image 504. This relationship may be characterized as a co-planarity constraint. Additionally, a ray formed by the camera 502 and the pixel $d_3$ is co-linear with a ray formed by the camera 502 and the spatial point $L_3$ in the physical environment. This relationship may be characterized as a co-linearity constraint. Using these co-planarity and co-linearity constraints, the following equations may be determined:

$$(\vec{d}_1 \times \vec{d}_2)^T (R\vec{L}_1 + \vec{t}) = 0$$

$$(\vec{d}_1 \times \vec{d}_2)^T (R\vec{L}_2 + \vec{t}) = 0$$

$$[\vec{d}_3] \times (R\vec{L}_3 + \vec{t}) = 0$$

In some implementations, these equations are used to determine the pose of the camera 502 using a line correspondence, a point correspondence, and a directional measurement, such as a gravity vector. The pose of the camera 502 may be characterized by a transformation $R, \vec{t}$ that transforms coordinates in the image 504 to coordinates in the physical environment, where R is a rotation matrix and $\vec{t}$ is a vector.

In some implementations, a directional measurement, such as a gravity vector, is known. The rotation matrix R may be parameterized in terms of yaw as $R = R_x R_y R_z$. Roll $(R_x)$ and pitch $(R_y)$ are known and may be expressed as $R_v = R_x R_y$. The yaw $(R_z)$ may be parameterized in terms of $\theta$ as $R_z = R_\theta$. Accordingly, the rotation matrix R may be expressed as $R = R_v R_\theta$, where $R_\theta$ is a yaw rotation matrix.

In some implementations, the yaw rotation matrix is parameterized as $$R_\theta = \begin{bmatrix} \cos(\theta) & -\sin(\theta) & 0 \\ \sin(\theta) & \cos(\theta) & 0 \\ 0 & 0 & 1 \end{bmatrix} = \begin{bmatrix} c & -s & 0 \\ s & c & 0 \\ 0 & 0 & 1 \end{bmatrix}$$

Using this parameterization, given a matrix A having a dimension N×3, an equation of the form $A(R\vec{X} + \vec{t}) = 0$ may be simplified as follows:

$$A(R\vec{X} + \vec{t}) = 0$$

$$A(R_v R_\theta \vec{X} + \vec{t}) = 0, \because R = R_v R_\theta$$

$$A \left( R_v \begin{bmatrix} c & -s & 0 \\ s & c & 0 \\ 0 & 0 & 1 \end{bmatrix} \vec{X} + \vec{t} \right) = 0$$

$$A \left( R_v \begin{bmatrix} c & -s & 0 \\ s & c & 0 \\ 0 & 0 & 1 \end{bmatrix} \begin{bmatrix} X \\ Y \\ Z \end{bmatrix} + \begin{bmatrix} t_1 \\ t_2 \\ t_3 \end{bmatrix} \right) = 0$$

$$A \left( R_v \left( \begin{bmatrix} c & -s & 0 \\ s & c & 0 \\ 0 & 0 & 1 \end{bmatrix} \begin{bmatrix} X \\ Y \\ Z \end{bmatrix} + \begin{bmatrix} 0 \\ 0 \\ 1 \end{bmatrix} Z \right) + \begin{bmatrix} t_1 \\ t_2 \\ t_3 \end{bmatrix} \right) = 0$$

$$A \left( R_v \left( \begin{bmatrix} 1 & 0 \\ 0 & 1 \\ 0 & 0 \end{bmatrix} \begin{bmatrix} c & -s \\ s & c \end{bmatrix} \begin{bmatrix} X \\ Y \end{bmatrix} + \begin{bmatrix} 0 \\ 0 \\ 1 \end{bmatrix} Z \right) + \begin{bmatrix} t_1 \\ t_2 \\ t_3 \end{bmatrix} \right) = 0$$

$$A R_v \begin{bmatrix} 1 & 0 \\ 0 & 1 \\ 0 & 0 \end{bmatrix} \begin{bmatrix} c & -s \\ s & c \end{bmatrix} \begin{bmatrix} X \\ Y \end{bmatrix} + A R_v \begin{bmatrix} 0 \\ 0 \\ 1 \end{bmatrix} Z + A \begin{bmatrix} t_1 \\ t_2 \\ t_3 \end{bmatrix} = 0$$

$$A R_v \begin{bmatrix} 1 & 0 \\ 0 & 1 \\ 0 & 0 \end{bmatrix} \begin{bmatrix} c & -s \\ s & c \end{bmatrix} \begin{bmatrix} X \\ Y \end{bmatrix} + A R_v \begin{bmatrix} 0 \\ 0 \\ 1 \end{bmatrix} Z + A \begin{bmatrix} t_1 \\ t_2 \\ t_3 \end{bmatrix} = 0$$

Using the Kronecker product $$vec(AYB) = B^T \otimes A) vec(Y)$$

the following equations may be obtained:

$$\left( \begin{bmatrix} X \\ Y \end{bmatrix}^T \otimes A R_v \begin{bmatrix} 1 & 0 \\ 0 & 1 \\ 0 & 0 \end{bmatrix} \right) \begin{bmatrix} c \\ -s \\ s \\ c \end{bmatrix} + A R_v \begin{bmatrix} 0 \\ 0 \\ 1 \end{bmatrix} Z + A \begin{bmatrix} t_1 \\ t_2 \\ t_3 \end{bmatrix} = 0$$

$$\left( \begin{bmatrix} X \\ Y \end{bmatrix}^T \otimes A R_v \begin{bmatrix} 1 & 0 \\ 0 & 1 \\ 0 & 0 \end{bmatrix} \right) \begin{bmatrix} 1 & 0 \\ 0 & -1 \\ 0 & 1 \\ 1 & 0 \end{bmatrix} \begin{bmatrix} c \\ s \end{bmatrix} + A R_v \begin{bmatrix} 0 \\ 0 \\ 1 \end{bmatrix} Z + A \begin{bmatrix} t_1 \\ t_2 \\ t_3 \end{bmatrix} = 0$$

These equations may be expressed in the form:

$$D \begin{bmatrix} c \\ s \end{bmatrix} + E \begin{bmatrix} t_1 \\ t_2 \\ t_3 \end{bmatrix} = b$$

$$[D_{N \times 2} \; E_{N \times 3}] \begin{bmatrix} c \\ s \\ t_1 \\ t_2 \\ t_3 \end{bmatrix} = b_{N \times 1}$$

$$A\chi = b$$

where $$D = \left(\begin{bmatrix} X \\ Y \end{bmatrix}^T \otimes AR_v \begin{bmatrix} 1 & 0 \\ 0 & 1 \\ 0 & 0 \end{bmatrix}\right) \begin{bmatrix} 1 & 0 \\ 0 & -1 \\ 0 & 1 \\ 1 & 0 \end{bmatrix}$$

$E=A$, $b=-AR_v(:,3)Z$, $A=[D\ E]$, $X=(c,s,t_1,t_2,t_3)^T$. This is a linear system of the form $AX=b$. In some implementations, the solution to the linear system is found using SVD. In this solution, the orthogonality of the rotation matrix is not taken into consideration. The orthogonality can be enforced by $\cos^2\theta + \sin^2\theta = 1$ or $c^2+s^2=1$.

Using rotation parameterization as disclosed herein, the equations $$(\vec{d}_1 \times \vec{d}_2)^T(R\vec{L}_1+\vec{t})=0$$

$$(\vec{d}_1 \times \vec{d}_2)^T(R\vec{L}_2+\vec{t})=0$$

$$[\vec{d}_3]\times(R\vec{L}_3+\vec{t})=0$$

may be expressed as:

$$\mathcal{A} = \begin{bmatrix} \left(\begin{bmatrix} L_{1,x} & L_{1,y} \\ L_{2,x} & L_{2,y} \end{bmatrix} \otimes (\vec{d}_1 \times \vec{d}_2)^T R_v \begin{bmatrix} 1 & 0 \\ 0 & 1 \\ 0 & 0 \end{bmatrix}\right) \begin{bmatrix} 1 & 0 \\ 0 & -1 \\ 0 & 1 \\ 1 & 0 \end{bmatrix} & \begin{bmatrix} 1 \\ 1 \end{bmatrix}(\vec{d}_1 \times \vec{d}_2)^T \\ \left(\begin{bmatrix} L_{3,x} \\ L_{3,y} \end{bmatrix}^T \otimes [\vec{d}_3]_x R_v \begin{bmatrix} 1 & 0 \\ 0 & 1 \\ 0 & 0 \end{bmatrix}\right) \begin{bmatrix} 1 & 0 \\ 0 & -1 \\ 0 & 1 \\ 1 & 0 \end{bmatrix} & [\vec{d}_3]_x \end{bmatrix}$$

$$b = \begin{bmatrix} -(\vec{d}_1 \times \vec{d}_2)^T R_v(:,3)L_{1,z} \\ -(\vec{d}_1 \times \vec{d}_2)^T R_v(:,3)L_{2,z} \\ -[\vec{d}_3]_x R_v(:,3)L_{3,z} \end{bmatrix}$$

The dimension of the matrix A is 5×5, and the rank of the matrix A is 4. Accordingly, the system of linear equations has null(A)=1. Thus, in some implementations, the pose information solution is of the form where $$A\chi = b$$

$$\chi = \chi_0 + \lambda\chi_1$$

where $$\chi_0 = V\Sigma^{-1}U^T b$$

where $A=U\Sigma V^T$ is a singular value decomposition (SVD).

$$\chi_1 = \text{null}(A)$$

is the last column of V. By enforcing an orthogonality constraint, the value of $\lambda$ can be recovered, which gives a quadratic equation in $\lambda$ that has at most two roots.

In some implementations, the equations $$(\vec{d}_1 \times \vec{d}_2)^T(R\vec{L}_1+\vec{t})=0$$

$$(\vec{d}_1 \times \vec{d}_2)^T(R\vec{L}_2+\vec{t})=0$$

$$[\vec{d}_3]\times(R\vec{L}_3+\vec{t})=0$$

are formulated in quadratic form. This formulation models orthogonality constraints implicitly. Using the first two of the above equations, the following equations can be obtained:

$$(\vec{d}_1 \times \vec{d}_2)^T R(\vec{L}_1 - \vec{L}_2) = 0$$

$$(\vec{d}_1 \times \vec{d}_2)^T R_v \begin{bmatrix} 1-q^2 & -2q & 0 \\ 2q & 1-q^2 & 0 \\ 0 & 0 & 1+q^2 \end{bmatrix} (\vec{L}_1 - \vec{L}_2) = 0$$

$$\vec{n}^T R_v \begin{bmatrix} 1-q^2 & -2q & 0 \\ 2q & 1-q^2 & 0 \\ 0 & 0 & 1+q^2 \end{bmatrix} \vec{V} = 0$$

where $\vec{n} = \vec{d}_1 \times \vec{d}_2$ and $\vec{V} = (v_1, v_2, v_3)^T = \vec{L}_1 - \vec{L}_2$. This yields a quadratic equation of the form $$aq^2 + bq + c = 0$$

where $$a = \vec{n}^T R_v \begin{bmatrix} -v_1 \\ -v_2 \\ v_3 \end{bmatrix}$$

$$b = 2\vec{n}^T (R_v(:,2)v_1 - R_v(:,1)v_2)$$

$$c = \vec{n}^T R_v \vec{V}$$

The above quadratic equation gives two solutions for q. The value of $\vec{t}$ may be obtained using a system of linear equations from the equations $$(\vec{d}_1 \times \vec{d}_2)^T(R\vec{L}_1+\vec{t})=0$$

$$(\vec{d}_1 \times \vec{d}_2)^T(R\vec{L}_2+\vec{t})=0$$

$$[\vec{d}_3]\times(R\vec{L}_3+\vec{t})=0$$

by substituting the value of q.

Figure 6:
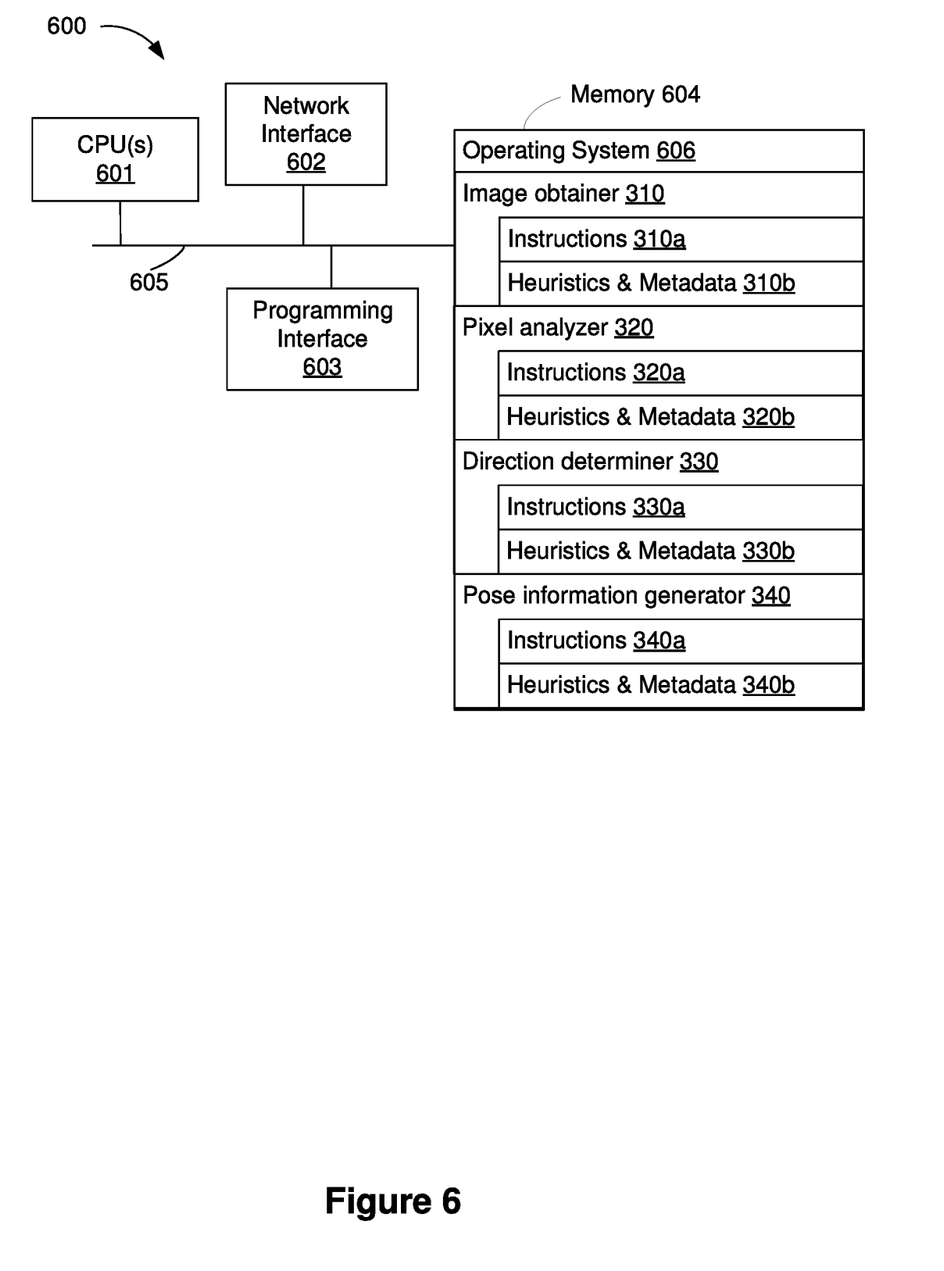
FIG. 6 is a block diagram of a device in accordance with some implementations.

FIG. 6 is a block diagram of a device 600 (e.g., a server system) enabled with one or more components of a device (e.g., the electronic device 102 and/or the controller 104 shown in FIG. 1) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units (CPUs) 601, a network interface 602, a programming interface 603, a memory 604, and one or more communication buses 605 for interconnecting these and various other components.

In some implementations, the network interface 602 is provided to, among other uses, establish, and maintain a metadata tunnel between a cloud hosted network management system and at least one private network including one or more compliant devices. In some implementations, the one or more communication buses 605 include circuitry that interconnects and controls communications between system components. The memory 604 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 604 optionally includes one or more storage devices remotely located from the one or more CPUs 601. The memory 604 comprises a non-transitory computer readable storage medium.

In some implementations, the memory 604 or the non-transitory computer readable storage medium of the memory 604 stores the following programs, modules and data structures, or a subset thereof including an optional operating system 606, the image obtainer 310, the pixel analyzer 320, the direction determiner 330, and/or the pose information generator 340. As described herein, the image obtainer 310 may include instructions 310a and/or heuristics and metadata 310b for obtaining an image from a component of a device in which the pose estimation device 300 is integrated or from a device with which the pose estimation device 300 is in communication. As described herein, the pixel analyzer 320 may include instructions 320a and/or heuristics and metadata 320b for determining correspondences between pixels in the obtained image and features in a physical environment, such as spatial points or spatial lines. As described herein, the direction determiner 330 may include instructions 330a and/or heuristics and metadata 330b for determining a directional measurement, such as a gravity measurement or a gravity vector, for example, based on the obtained image or based on measurements from an IMU. As described herein, the pose information generator 340 may include instructions 340a and/or heuristics and metadata 340b for generating (e.g., estimating) pose information based on a point correspondence, a line correspondence, and a directional measurement.

It will be appreciated that FIG. 6 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 6 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including a non-transitory memory and one or more processors coupled with the non-transitory memory:
   obtaining an image corresponding to a physical environment;
   determining a first correspondence between a first set of pixels in the image and a spatial point in the physical environment;
   determining a second correspondence between a second set of pixels in the image and a spatial line in the physical environment; and
   generating pose information as a function of the first correspondence, the second correspondence, and a directional measurement.

2. The method of claim 1, further comprising determining the directional measurement.

3. The method of claim 2, further comprising determining the directional measurement based on the image.

4. The method of claim 3, further comprising determining the directional measurement based on a third set of pixels in the image that corresponds to a vertical spatial line in the physical environment.

5. The method of claim 2, wherein the device comprises an inertial measurement unit (IMU).

6. The method of claim 5, further comprising obtaining the directional measurement from the IMU.

7. The method of claim 1, wherein the directional measurement is a gravity measurement relating to a direction of gravity.

8. The method of claim 1, wherein the directional measurement is a gravity vector indicating a direction of gravity.

9. The method of claim 8, further comprising obtaining the gravity vector.

10. The method of claim 9, wherein obtaining the gravity vector comprises:
   determining a gravity measurement; and
   synthesizing the gravity vector based on the gravity measurement.

11. The method of claim 9, wherein obtaining the gravity vector comprises determining the gravity vector based on an orientation of a physical article.

12. The method of claim 11, wherein the physical article is represented by a third set of pixels in the image.

13. The method of claim 1, wherein the first correspondence is a point correspondence.

14. The method of claim 1, wherein the second correspondence is a line correspondence.

15. The method of claim 1, wherein generating the pose information as the function of the first correspondence, the second correspondence, and the directional measurement comprises estimating the pose information.

16. The method of claim 1, further comprising:
   determining a plurality of first correspondences between a plurality of first sets of pixels in the image and respective spatial points in the physical environment;
   determining a plurality of second correspondences between a plurality of second sets of pixels in the image and respective spatial lines in the physical environment; and
   generating the pose information as a function of the plurality of first correspondences, the plurality of second correspondences, and a plurality of directional measurements.

17. The method of claim 16, wherein generating the pose information comprises generating a plurality of candidate pose estimates as a function of the plurality of first correspondences, the plurality of second correspondences, and the plurality of directional measurements.

18. The method of claim 17, wherein generating the pose information comprises selecting a candidate pose estimate of the plurality of candidate pose estimates that is supported by a threshold number of at least one of the plurality of first correspondences, the plurality of second correspondences, or the plurality of directional measurements.

19. A device comprising:
   one or more processors;
   a non-transitory memory; and
   one or more programs stored in the non-transitory memory, which, when executed by the one or more processors, cause the device to:
      obtain an image corresponding to a physical environment;
      determine a first correspondence between a first set of pixels in the image and a spatial point in the physical environment;
      determine a second correspondence between a second set of pixels in the image and a spatial line in the physical environment; and
      generate pose information as a function of the first correspondence, the second correspondence, and a directional measurement.

20. A non-transitory memory storing one or more programs, which, when executed by one or more processors of a device, cause the device to:
   obtain an image corresponding to a physical environment;
   determine a first correspondence between a first set of pixels in the image and a spatial point in the physical environment;
   determine a second correspondence between a second set of pixels in the image and a spatial line in the physical environment; and
   generate pose information as a function of the first correspondence, the second correspondence, and a directional measurement.

* * * * *